(12) United States Patent
Jang

(10) Patent No.: US 11,338,805 B2
(45) Date of Patent: May 24, 2022

(54) METHOD AND APPARATUS FOR CONTROLLING MILD HYBRID ELECTRIC VEHICLE

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 16/921,669

(22) Filed: Jul. 6, 2020

(65) Prior Publication Data

US 2021/0206371 A1    Jul. 8, 2021

(30) Foreign Application Priority Data

Jan. 6, 2020  (KR) .......................... 10-2020-0001456

(51) Int. Cl.
*B60W 30/16* (2020.01)
*F02N 11/08* (2006.01)
(Continued)

(52) U.S. Cl.
CPC ............ *B60W 30/16* (2013.01); *B60W 10/06* (2013.01); *B60W 10/18* (2013.01); *B60W 30/02* (2013.01);
(Continued)

(58) Field of Classification Search
CPC .... B60W 30/16; B60W 30/02; B60W 30/143; B60W 10/06; B60W 10/18;
(Continued)

(56) References Cited

U.S. PATENT DOCUMENTS 10,766,489 B2 *   9/2020   Tuncali ............... B60W 30/162
2019/0232789 A1 *  8/2019   Kinoshita ............. B60T 8/172
(Continued)

FOREIGN PATENT DOCUMENTS

| KR | 2016-0065306 A | 6/2016 |
| KR | 2017-0119534 A | 10/2017 |
| KR | 2019-0073173 A | 6/2019 |

*Primary Examiner* — George C Jin
(74) *Attorney, Agent, or Firm* — Morgan, Lewis & Bockius LLP

(57) ABSTRACT

A method of controlling a mild hybrid electric vehicle may include determining whether a Smart Cruise Control (SCC) mode is set according to a signal input through a driver interface; determining whether an Start Stop Control (SSC) entrance condition is satisfied when the SCC mode is set; when the SSC entrance condition is determined by the control unit, to be satisfied to enter an SSC mode, interrupting a supply of fuel to an engine and turning off the engine; monitoring a distance in which the control unit determines whether a distance to a front vehicle is increased or decreased based on a front distance signal transmitted from a detecting unit electrically-connected to the control unit; and increasing or decreasing a vehicle speed by controlling the engine, a Mild Hybrid Starter Generator (MHSG), or an Electronic Stability Control (ESC) based on the monitoring of the distance.

20 Claims, 5 Drawing Sheets

(51) Int. Cl.
  *B60W 30/02* (2012.01)
  *F02N 11/04* (2006.01)
  *B60W 10/18* (2012.01)
  *B60W 10/06* (2006.01)
  *B60W 30/14* (2006.01)
  *F02D 41/04* (2006.01)

(52) U.S. Cl.
  CPC ......... *B60W 30/143* (2013.01); *F02D 41/042* (2013.01); *F02N 11/04* (2013.01); *F02N 11/0829* (2013.01); *B60W 2510/244* (2013.01); *B60W 2520/00* (2013.01); *B60W 2554/80* (2020.02); *F02N 2200/061* (2013.01); *F02N 2200/0801* (2013.01)

(58) Field of Classification Search
  CPC ....... B60W 2510/244; B60W 2520/00; B60W 2554/80; F02D 41/042; F02N 11/04; F02N 11/0829; F02N 2200/061; F02N 2200/0801; B60N 2554/802
  See application file for complete search history.

(56) References Cited

U.S. PATENT DOCUMENTS

2021/0206365 A1* 7/2021 Jang ................... B60W 30/143
2021/0206371 A1* 7/2021 Jang ................... F02N 11/0829

* cited by examiner

METHOD AND APPARATUS FOR CONTROLLING MILD HYBRID ELECTRIC VEHICLE

CROSS-REFERENCE TO RELATED APPLICATION

The present application claims priority to Korean Patent Application No. 10-2020-0001456 filed on Jan. 6, 2020, the entire contents of which is incorporated herein for all purposes by this reference.

BACKGROUND OF THE PRESENT INVENTION

Field of the Invention

The present invention relates to a method and an apparatus of controlling a mild hybrid electric vehicle.

Description of Related Art

Due to soaring oil prices and the increasing social interest in the environment, the vehicle industry places great importance on improving fuel efficiency of a vehicle and developing environment-friendly vehicles. To this end, the technology development on a Hybrid Electric Vehicle (HEV) is being actively conducted.

The HEV is classified into a hard-type HEV, a middle-type HEV, and a mild-type HEV according to a power sharing ratio of an engine and a driving motor. The form in which a capacity of the driving motor is greater than a capacity of the engine is the hard type, the form in which a capacity of the driving motor is similar to a capacity of the engine is the middle type, and the form in which a capacity of the driving motor is smaller than a capacity of the engine is the mild type.

The mild-type HEV (hereinafter, referred to as the mild HEV) utilizes a 48 V battery together with a 12 V battery, being differentiated from a general HEV For example, a general HEV using a 12 V battery is difficult to cope with the flow of a vehicle change which requires an increase of an indoor display size, a dashboard changed to a digital monitor, smart phone wireless charging, mounting an autonomous driving system using a camera and various sensors, and the like. In the meantime, the mild HEV additionally mounted with a 48 V battery may be operated only with a motor of an air conditioner, so that the mild HEV may cope with the flow of the recent vehicle change, and problems in the related art caused by lower power consumption, such as the case where the vehicle does not start due to the end of the battery life in winter, may be solved.

The mild HEV adds a 48 V battery to a conventional vehicle, and includes an inverter converting 48 V and 12 V, and a Mild Hybrid Starter Generator (MHSG) which starts an engine or generates power by an output of the engine, instead of an alternator mounted to a conventional engine. The MHSG is a core component of the mild HEV.

In simply shaping a structure of the mild HEV, the MHSG connected to the engine through a belt assists power of the engine during acceleration and generates electricity through regenerative power generation during deceleration. The generated electricity is amplified through the inverter and is stored in each of a 48 V battery and a 12 V battery through a converter which converts a voltage, and then is utilized for driving electronic components inside the vehicle.

In the meantime, recently, there is increasing public interest in a Smart Cruise Control (SCC) function for improving the convenience of driving for a driver and a Start Stop Control (SSC) function configured for maximizing fuel efficiency of a vehicle.

However, there is no study on a particular method for efficiently controlling the SCC function and the SSC function when the SCC function and the SSC function are simultaneously applied to the 48 V mild HEV to implement an increase in convenience of the driving of a driver and the improvement in fuel efficiency of a vehicle at the same time.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and an apparatus of controlling a mild hybrid starter generator (MHSG) and an engine based on a distance to a front vehicle when a Smart Cruise Control (SCC) mode and a Stop Start Control (SSC) mode are simultaneously applied to a 48 V Mild Hybrid Electric Vehicle (MHEV) at the same time.

Various aspects of the present invention are directed to providing a method of controlling a mild hybrid electric vehicle, the method including: determining whether a Smart Cruise Control (SCC) mode is set according to a signal input through a driver interface; determining whether an Start Stop Control (SSC) entrance condition is satisfied when the SCC mode is set; when the SSC entrance condition is determined by the control unit, to be satisfied to enter an SSC mode, interrupting a supply of fuel to an engine and turning off the engine; monitoring a distance in which the control unit determines whether a distance to a front vehicle is increased or decreased based on a front distance signal transmitted from the detecting unit to the control unit; and increasing or decreasing a vehicle speed by controlling the engine, a Mild Hybrid Starter Generator (MHSG), or an Electronic Stability Control (ESC) based on the monitoring of the distance.

The increasing or decreasing of the vehicle speed may include: when it is determined that the distance to the front vehicle is decreased in the monitoring of the distance, determining whether a State of charge (SOC) value of a battery is in a predetermined range; and when the SOC value of the battery is not enough, determining a regenerative torque according to a target decrease speed and controlling the MHSG to output the determined regenerative torque.

The increasing or decreasing of the vehicle speed may further include: when the SOC value of the battery is in the predetermined range, determining whether a brake negative pressure is in a normal state; and when the brake negative pressure is determined by the control unit, to be in an abnormal state, releasing the SSC mode, turning on the engine, and securing a brake negative pressure.

The increasing or decreasing of the vehicle speed may further include: when the brake negative pressure is determined by the control unit, to be in the normal state, determining whether an ESC system is normal; and when the ESC system is determined by the control unit to be normal, performing an ESC braking control.

The increasing or decreasing of the vehicle speed may include when it is determined that the distance to the front vehicle is increased in the monitoring of the distance, determining whether an SOC value of a battery is enough.

The increasing or decreasing of the vehicle speed may further include when the SOC value of the battery is in the predetermined range, determining a compensation torque according to a target increase speed and controlling the MHSG to output the determined compensation torque.

The increasing or decreasing of the vehicle speed may further include when the SOC value of the battery is beyond the predetermined range, releasing the SSC mode, resuming the supply of fuel to the engine and turning on the engine.

Various aspects of the present invention are directed to providing a method of controlling a mild hybrid electric vehicle, the method including: determining whether a Smart Cruise Control (SCC) mode is set according to a signal input through a driver interface; determining whether an Start Stop Control (SSC) entrance condition is satisfied when the SCC mode is set; when the SSC entrance condition is determined by the control unit, to be satisfied to enter an SSC mode, interrupting a supply of fuel to an engine and turning off the engine; when the engine is turned off, determining whether a road on which the vehicle is travelling is uphill or downhill based on an uphill/downhill signal transmitted from a detecting unit electrically-connected to the control unit; and increasing or decreasing a vehicle speed by controlling the engine, a Mild Hybrid Starter Generator (MHSG), or an Electronic Stability Control (ESC) according to the determination result of the uphill road or the downhill road.

The increasing or decreasing of the vehicle speed may include: a first State Of Charge (SOC) investigation operation in which when the road on which the vehicle is travelling is determined by the control unit to be uphill, the control unit determines whether an SOC value of a battery is in a predetermined range; and a first distance monitoring operation in which when the SOC value of the battery is in the predetermined range in the first SOC investigation operation, the control unit is configured to determine whether to increase or decrease a distance to a front vehicle based on a front distance signal transmitted from the detecting unit to the control unit.

The increasing or decreasing of the vehicle speed may further include when it is determined that the distance to the front vehicle is decreased in the first distance monitoring operation, determining a regenerative torque according to a target decrease speed and controlling the MHSG to output the determined regenerative torque.

The first distance monitoring operation may further include when it is determined that the distance to the front vehicle is increased in the first distance monitoring operation, determining a compensation torque according to a target increase speed and controlling the MHSG to output the determined compensation torque.

The increasing or decreasing of the vehicle speed may further include when the SOC value of the battery is beyond the predetermined range in the first SOC investigation operation, releasing the SSC mode, resuming the supply of fuel to the engine, and turning on the engine.

The increasing or decreasing of the vehicle speed may include a second distance monitoring operation in which when the road on which the vehicle is travelling is determined by the control unit, to be downhill, the control unit is configured to determine whether to increase or decrease a distance to a front vehicle based on a front distance signal transmitted from the detecting unit to the control unit.

The increasing or decreasing of the vehicle speed may further include: a second SOC investigation operation in which when it is determined that the distance to the front vehicle is decreased in the second distance monitoring operation, determining whether an SOC value of a battery is in a predetermined range; and when the SOC value of the battery is beyond the predetermined range in the second SOC investigation operation, determining a regenerative torque according to a target decrease speed and controlling the MHSG to output the determined regenerative torque.

The increasing or decreasing of the vehicle speed may further include: when the SOC value of the battery is enough in the second SOC investigation operation, determining whether a brake negative pressure is in a normal state; and when the brake negative pressure is determined by the control unit, to be in an abnormal state, releasing the SSC mode, turning on the engine, and securing a brake negative pressure.

The increasing or decreasing of the vehicle speed may further include: when the brake negative pressure is determined by the control unit, to be in the normal state, determining whether an ESC system is normal; and when the ESC system is determined by the control unit to be normal, performing an ESC braking control.

The increasing or decreasing of the vehicle speed may further include a third SOC investigation operation in which when it is determined that the distance to the front vehicle is increased in the second distance monitoring operation, determining whether an SOC value of a battery is enough.

The increasing or decreasing of the vehicle speed may further include when the SOC value of the battery is determined by the control unit to be in a predetermined range in the third SOC investigation operation, determining a compensation torque according to a target increase speed and controlling the MHSG to output the determined compensation torque.

The increasing or decreasing of the vehicle speed may further include when the SOC value of the battery is determined by the control unit to be beyond the predetermined range in the third SOC investigation operation, releasing the SSC mode, resuming the supply of fuel to the engine, and turning on the engine.

Various aspects of the present invention are directed to providing an apparatus of controlling a mild hybrid electric vehicle, the apparatus including: a detecting unit configured to output at least one detection signal among a signal input through a driver interface, a vehicle speed signal, a front distance signal, an uphill/downhill signal, an accelerator pedal detection signal, and a brake pedal detection signal; and a control unit electrically-connected to the detecting unit and configured to receive the detection signal, determine whether a Smart Cruise Control (SCC) mode is set and a vehicle enters a Start Stop Control (SSC) mode, interrupt a supply of fuel to an engine when the SCC mode and the SSC mode are applied, and turn off the engine, in which the control unit determines whether a distance to a front vehicle is increased or decreased based on a front distance signal transmitted from the detecting unit to the control unit in an off state of the engine and increases or decreases a vehicle speed by controlling the engine, a Mild Hybrid Starter Generator (MHSG), or an Electronic Stability Control (ESC) based on the determination result.

When it is determined that the distance to the front vehicle is decreased, the control unit may determine whether a State of charge (SOC) value of a battery is in a predetermined range, and when the SOC value of the battery is beyond the predetermined range, the control unit may determine a regenerative torque according to a target decrease speed and control the MHSG to output the determined regenerative torque.

When the SOC value of the battery is enough, the control unit may determine whether a brake negative pressure is in a normal state, for instance, greater than a predetermined value of pressure and when the brake negative pressure is in an abnormal state, for instance, lower than the predetermined value of pressure, the control unit may release the SSC mode, turn on the engine, and secure a brake negative pressure.

When the brake negative pressure is in the normal state or the brake negative pressure is secured, the control unit may determine whether an ESC system is normal, and when the ESC system is normal, the control unit may perform an ESC braking control.

When it is determined that the distance to the front vehicle is increased, the control unit may determine whether an SOC value of a battery is enough, and when the SOC value of the battery is enough, the control unit may determine a compensation torque according to a target increase speed and control the MHSG to output the determined compensation torque.

When the SOC value of the battery is beyond the predetermined range, the control unit may release the SSC mode, resume the supply of fuel to the engine, and turn on the engine.

Various aspects of the present invention are directed to providing an SCC-SSC combination control method and apparatus in a 48 V mild hybrid electric vehicle, expecting both the improvement in driver's convenience in driving and the improvement in fuel efficiency of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
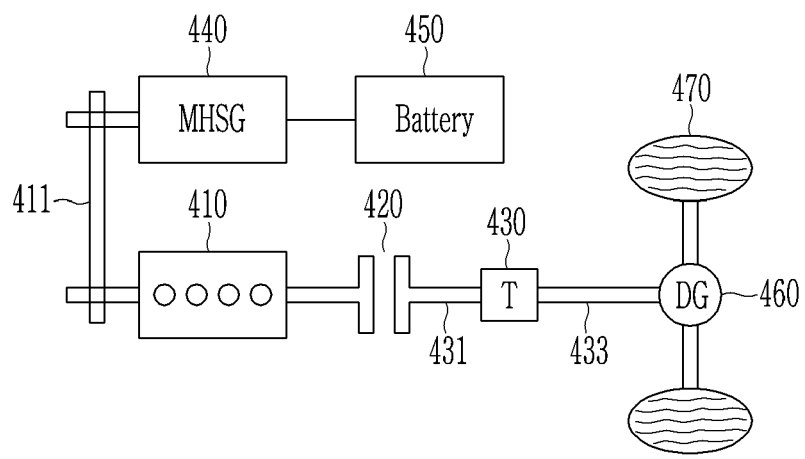
FIG. 1 is a block diagram illustrating a mild hybrid electric vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment included in the exemplary embodiment will be described in detail with reference to the accompanying drawings, and the same or similar elements will be designated by the same or similar reference numerals, and the overlapping description thereof will be omitted. Suffixes, "module" and "unit" for a constituent element used for the description below are provided or mixed in consideration of only easiness of the writing of the specification, and the suffix itself does not have a discriminated meaning or role. Furthermore, in describing the exemplary embodiment included in an exemplary embodiment of the present invention, when it is determined that detailed description relating to well-known functions or configurations may make the subject matter of the exemplary embodiment included in an exemplary embodiment of the present invention unnecessarily ambiguous, the detailed description will be omitted. Furthermore, the accompanying drawings are provided for helping to easily understand exemplary embodiments included in the exemplary embodiment, and the technical spirit included in the exemplary embodiment of the present invention is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

It may be understood that when one constituent element is referred to as being "coupled to" or "connected to" another constituent element, one constituent element may be directly coupled to or connected to the other constituent element, but intervening elements may also be present. In contrast, when one constituent element is "directly coupled to" or "directly connected to" another constituent element, it may be understood that there are no intervening element present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 2:
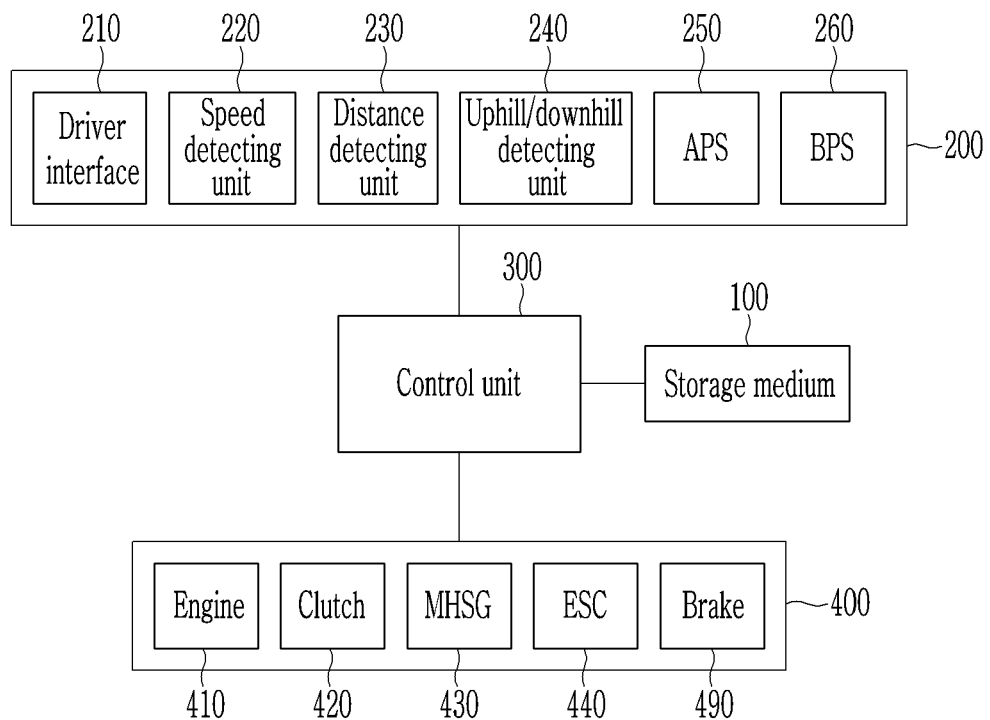
FIG. 2 is a block diagram for describing a portion of a configuration of an apparatus of controlling the mild hybrid electric vehicle according to an exemplary embodiment of the present invention.

FIG. 1 is a block diagram illustrating a mild hybrid electric vehicle according to an exemplary embodiment of the present invention, and FIG. 2 is a block diagram for describing a portion of a configuration of an apparatus of controlling an acceleration or a deceleration of a vehicle in a situation where a Smart Cruise Control (SCC) mode and a Start Stop Control (SSC) are simultaneously applied in the mild hybrid electric vehicle according to an exemplary embodiment of the present invention.

Referring to FIG. 1, the mild hybrid electric vehicle includes an engine 410, a clutch 420, a transmission 430, a Mild Hybrid Starter Generator (MHSG) 440, a battery 450, a differential gear system 460, and wheels 470.

In the power transmission of the mild hybrid electric vehicle, a torque generated in the engine 410 is transmitted to an input shaft 431 of the transmission 430 and a torque output from an output shaft 433 of the transmission 430 is transmitted to an axle via the differential gear system 460. The axle rotates the wheels 470, so that the mild hybrid electric vehicle travels by the torque generated in the engine 410.

The engine 410 combusts fuel and air and converts chemical energy to mechanical energy. A combustion torque of the engine 410 may be generated by controlling ignition timing, the air amount, the fuel amount, an air-fuel ratio, and the like.

The clutch 420 is mounted between the engine 410 and the transmission 430, and fastens or separates the engine 410 and the transmission 430 and selectively connects the engine 410 and the transmission 430. For example, the clutch 420 selectively transmits the torque generated in the engine 410 to the transmission 430.

The transmission 430 changes a gear ratio according to a travelling state of the mild hybrid electric vehicle to implement a gear shifting to a target gear shifting stage.

The MHSG 440 may operate the engine 410 or generate electricity by power of the engine 410. For example, the MHSG 440 may assist the torque of the engine 410. Accordingly, the mild hybrid electric vehicle may use the torque of the MHSG 440 as auxiliary power while using the combustion torque of the engine 410 as main power. In FIG. 1, the MHSG 440 is connected to the engine 410 through a belt 411, but is not limited thereto, and the MHSG 440 may be located between the engine 410 and the clutch 420 or the clutch 420 and the differential gear system 460.

The battery 450 may supply electricity to the MHSG 440 or may be charged with electricity which is collected through the MHSG 440 in a regenerative braking mode. For example, the battery 450 may include a 48 V battery, a Low voltage DC-DC Converter (LDC) which converts a voltage supplied from the 48 V battery to a low voltage, and a 12 V battery which supplies a lower voltage to an electronic load using a lower voltage.

Referring to FIG. 2, a control device of the mild hybrid electric vehicle includes a storage medium 100, a detecting unit 200, a control unit 300, and a controlled unit 400.

The storage medium 100 stores a method or a program of controlling an acceleration or a deceleration of a vehicle during uphill/downhill travelling in a situation where the SCC mode and the SSC mode are simultaneously applied.

The detecting unit 200 may include a driver interface 210, a speed detecting unit 220, a distance detecting unit 230, an uphill/downhill detecting unit 240, an Accelerator Pedal Position Sensor (APS) 250, and a Brake Pedal Position Sensor (BPS) 260. For example, the detecting unit 200 may output a signal input through the driver interface 210, a vehicle speed signal, a front distance signal, an uphill/downhill signal, and at least one of an accelerator pedal detection signal and a brake pedal detection signal to the control unit 300.

The driver interface 210 interfaces with a driver, and transmits the signals input according to a manipulation of the driver to the control unit 300. For example, the driver interface 210 may include a button for setting/releasing the SCC mode of the vehicle, a keypad, a microphone, a touch screen, and the like. The driver may set/release the SCC mode or set a target speed through the driver interface 210.

The speed detecting unit 220 detects a speed of the vehicle and transmits a detected vehicle speed signal to the control unit 300. For example, the speed detecting unit 220 may include a speed sensor.

The distance detecting unit 230 detects a distance to a front vehicle and transmits a detected front distance signal to the control unit 300. For example, the distance detecting unit 230 may detect a distance to a front vehicle by use of an Advanced Driver Assistance system (ADAS) sensor, an Intelligent Transport System (ITS) device, and the like.

The uphill/downhill detecting unit 240 determines whether a gradient of a road on which the vehicle is travelling corresponds to uphill or downhill, and transmits an uphill signal or a downhill signal to the control unit 300. When a gradient of a road on which the vehicle is travelling is greater than a predetermined reference value A, the uphill/downhill detecting unit 240 may determine that the road is uphill, and when a gradient of a road on which the vehicle is travelling is less than the predetermined reference value A, the uphill/downhill detecting unit 240 may determine that the road is downhill.

For example, the uphill/downhill detecting unit 240 may include an acceleration sensor, and when an acceleration of the vehicle is less than a predetermined reference value, the uphill/downhill detecting unit 240 may determine that a road is uphill, and when an acceleration of the vehicle is greater than the predetermined reference value, the uphill/downhill detecting unit 240 may determine that the road is downhill. For another example, the uphill/downhill detecting unit 240 may include a navigation system, and determine whether a gradient of a road on which the vehicle is travelling corresponds to uphill or downhill based on a Global Positioning System (GPS).

The APS 250 detects whether an accelerator pedal is operated, and transmits an accelerator pedal detection signal to the control unit 300.

The BPS 260 detects whether a brake is operated, and transmits a brake pedal detection signal to the control unit 300.

The control unit 300 may receive a detection signal from the detecting unit 200 and determine whether the SCC mode is set and the vehicle enters the SSC mode, and when the SCC mode and the SSC mode are applied, the control unit 300 may interrupt the supply of fuel to the engine 410 and turn off the engine 410.

For example, the control unit 300 may increase or decrease a vehicle speed by controlling at least one of the engine 410, the clutch 420, the MHSG 430, and the ESC 440 based on the uphill/downhill signal or the front distance signal transmitted from the detecting unit 200 in an off state of the engine 410.

Figure 3:
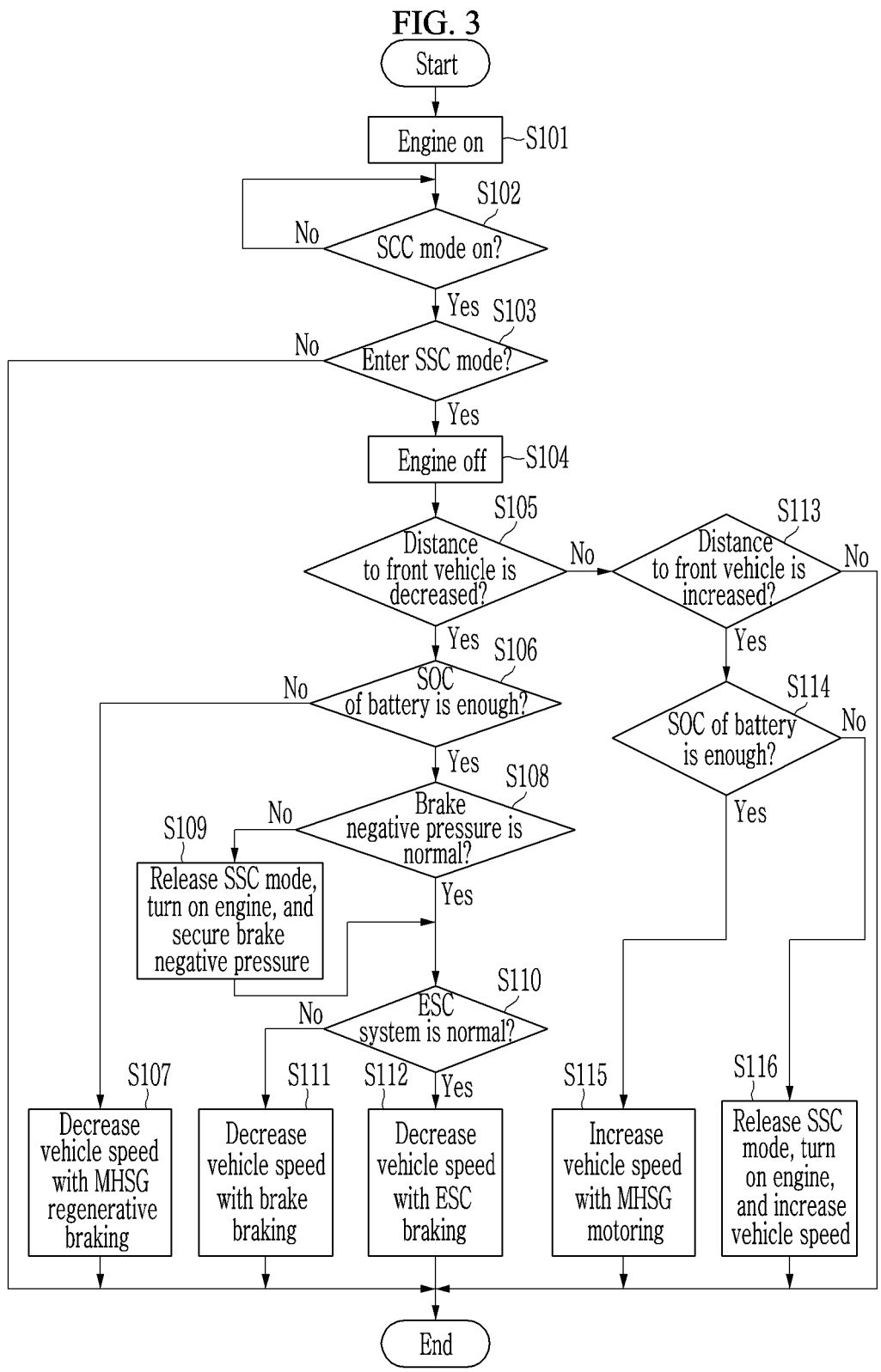
FIG. 3 is a flowchart for describing a method of controlling a vehicle speed according to a distance to a front vehicle in a situation where a Smart Cruise Control (SCC) mode and a Stop Start Control (SSC) mode are simultaneously applied according to an exemplary embodiment of the present invention.

FIG. 3 is a flowchart for describing a method of controlling a vehicle speed according to a distance to a front vehicle in a situation where the SCC mode and the SSC mode are simultaneously applied according to the exemplary embodiment of the present invention.

First, referring to FIG. 3, when the engine 410 is in an off state, the control unit 300 supplies fuel to drive the engine 410, and when the engine 410 has been already driven, the control unit 300 maintains a current on state (S101). In the instant case, the on state of the engine 410 may be a premise requirement for the application of the SCC mode and the SSC mode.

Next, the control unit 300 determines whether the SCC mode is set according to a signal input through the driver interface 210 (S102). For example, the control unit 300 may determine whether the SCC mode is set according to a signal transmitted through an input of a button mounted to a steering wheel and the like, a keypad, a microphone, a touch screen, and the like.

When the SCC mode is set (YES in S102), the control unit 300 may determine whether a predetermined SSC entrance condition is satisfied and determine whether the vehicle enters the SSC mode (S103). For example, when the accelerator pedal and the brake pedal are not operated and a speed of the vehicle is greater than a predetermined speed, the control unit 300 may determine that the SSC entrance condition is satisfied based on an accelerator pedal detection signal, a brake pedal detection signal, and a vehicle speed signal.

When the predetermined SSC entrance condition is not satisfied (NO in S103), the control unit 300 determines that the vehicle fails to enter the SSC mode and terminates an SCC-SSC combination control. In the instant case, the engine 410 maintains the on state.

When the predetermined SSC entrance condition is satisfied and the vehicle enters the SSC mode (YES in S103), the control unit 300 interrupts the supply of fuel to the engine 410 (fuel cut) to turn off the engine 410, and controls the clutch 420 to interrupt the transmission of power to the transmission 430 (clutch off) (S104).

Next, the control unit 300 determines whether a distance to a front vehicle is decreased based on a front distance signal transmitted from the detecting unit 200 (S105). When the SCC mode is applied, the control unit 300 controls peripheral devices so that the vehicle travels while maintaining a predetermined interval from the front vehicle. In the instant case, the predetermined interval may be differently set depending on performance of a brake 490, an intention of a designer, and the like.

In the SCC mode, the vehicle needs to be operated to maintain the predetermined interval from the front vehicle, so that when it is determined that the distance to the front vehicle is smaller than the predetermined interval, the control unit 300 performs a control of increasing the distance to the front vehicle until the distance becomes the predetermined interval by decreasing the vehicle speed. In contrast to this, when it is determined that the distance to the front vehicle is greater than the predetermined interval, the control unit 300 performs a control of decreasing the distance to the front vehicle until the distance becomes the predetermined interval by increasing the vehicle speed.

When it is necessary to decrease the vehicle speed due to the decrease in the distance to the front vehicle (YES in S105), the control unit 300 detects a State of charge (SOC) value of the battery 450 and determines a regenerative braking possibility of the MHSG 440 (S106). When the regenerative braking of the MHSG 440 exists in the state where the SOC value of the battery 450 is enough, i.e., greater than a predetermined value, a problem, such as deterioration of the battery, may occur, so that the control unit 300 does not perform the regenerative braking of the MHSG 440 when the SOC value of the battery 450 is enough.

Next, when the SOC value of the battery 450 is not enough (NO in S106), the control unit 300 determines a regenerative torque according to a target decrease speed to increase the distance to the front vehicle until the distance becomes the predetermined interval by decreasing the vehicle speed, and controls the MHSG 440 to output the determined regenerative torque (S107). Accordingly, the vehicle speed is decreased due to the regenerative braking of the MHSG 440, so that the distance to the front vehicle is increased and the battery 450 is charged.

Next, when the SOC value of the battery 450 is enough (YES in S106), the control unit 300 determines whether a brake negative pressure is in a normal state (S108). When the SOC value of the battery 450 is enough, it is impossible to decrease the vehicle speed through the MHSG 440, so that the braking control through the ESC 440 or the brake 490 is required, and the normal state of the brake negative pressure is verified on the premise of the necessity of the braking control through the ESC 440 or the brake 490

Next, when the brake negative pressure is not sufficient, so that it is not determined that the brake negative pressure is in the normal state, even though the driver presses the brake 490, it is impossible to accurately recognize the braking intention of the driver (NO in S108), so that the control unit 300 releases the SSC mode and turns on the engine 410 to secure the brake negative pressure (S109).

Next, when the brake negative pressure is sufficient, so that it is determined that the brake negative pressure is in the normal state (YES in S108) or the brake negative pressure is secured due to the turn-on of the engine 410, the control unit 300 investigates a normal state of an Electronic Stability Control (ESC) system (S110). The ESC system is a device configured for maintaining braking/steering safety by controlling braking force of a wheel and a torque of the engine 410 when a posture of the vehicle is unstable, and is operated even though the driver does not press the brake 490.

Next, when the ESC system is in an abnormal state (NO in S110), the control unit 300 induces the driver to press the brake 490 and decreases the speed of the vehicle (S111). When the ESC system is in the normal state (YES in S110), the control unit 300 decreases the speed of the vehicle through the ESC braking control (S112).

Next, when it is not determined that the distance to the front vehicle is decreased (NO in S105), the control unit 300 determines whether the distance to the front vehicle is increased based on the front distance signal transmitted from the detecting unit 200 (S113).

Next, when it is necessary to increase the vehicle speed due to the increase in the distance to the front vehicle (YES in S113), the control unit 300 detects an SOC value of the battery 450 and investigates a motoring possibility of the MHSG 440 (S114).

Next, when the SOC value of the battery 450 is enough (YES in S114), the control unit 300 determines a compensation torque according to a target increase speed to decrease the distance to the front vehicle until the distance becomes the predetermined interval by increasing the vehicle speed, and controls the MHSG 440 to output the determined compensation torque (S115). Accordingly, the vehicle speed is increased through the motoring of the MHSG 440 and the distance to the front vehicle is decreased.

Next, when the SOC value of the battery 450 is not enough (NO in S114), the increase in the vehicle speed through the MHSG 440 is impossible, so that the control unit 300 releases the SSC mode, resumes the supply of fuel to the engine 410 and turns on the engine 410, and fastens the clutch 420 (S116). Accordingly, the vehicle speed is increased with the torque of the engine 410 to decrease the distance to the front vehicle.

Figure 4:
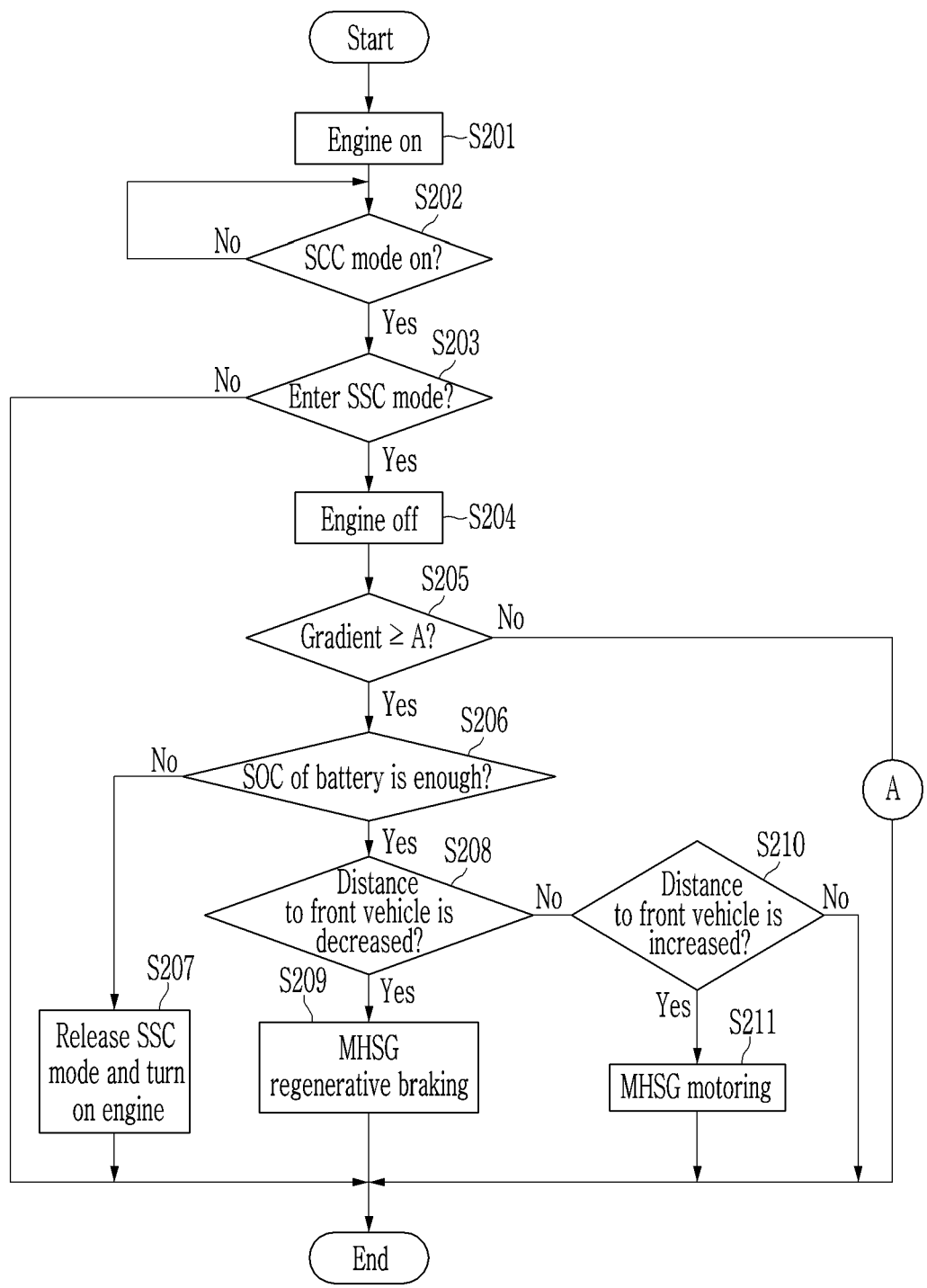
FIG. 4 is a flowchart for describing a method of controlling a vehicle speed according to a gradient and a distance to a front vehicle in a situation where an SCC mode and an SSC mode are simultaneously applied according to another exemplary embodiment of the present invention.
Figure 5:
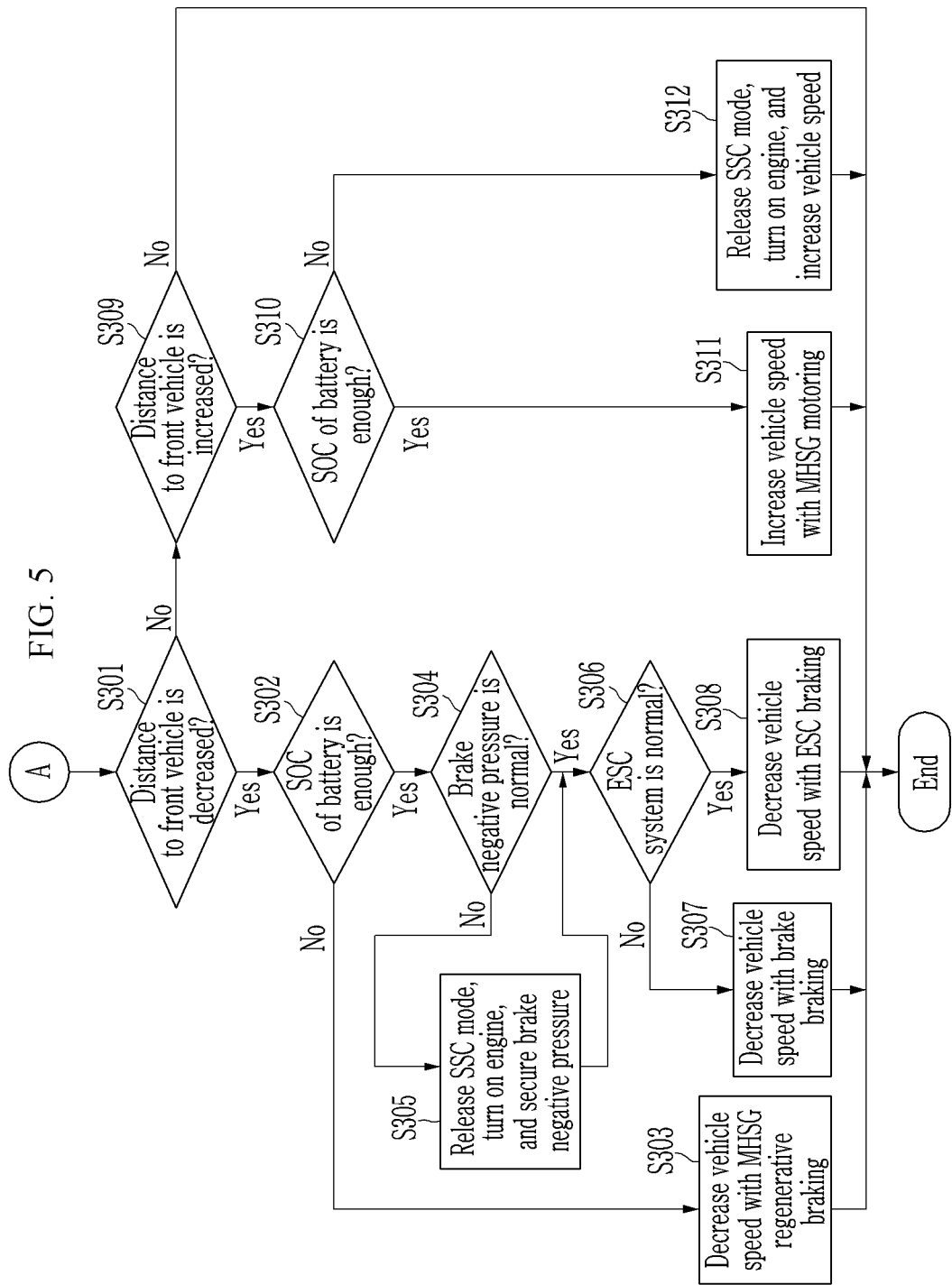
FIG. 5 is a flowchart for describing a method of controlling a vehicle speed when it is determined that a road is uphill in FIG. 4 in detail.

FIG. 4 is a flowchart for describing a method of controlling a vehicle speed according to a gradient and a distance to a front vehicle in a situation where the SCC mode and the SSC mode are simultaneously applied according to another exemplary embodiment of the present invention, and FIG. 5 is a flowchart for describing a method of controlling a vehicle speed when it is determined that a road is uphill in FIG. 4 in detail.

First, referring to FIG. 4, when the engine 410 is in an off state, the control unit 300 supplies fuel to drive the engine 410, and when the engine 410 has been already driven, the control unit 300 maintains a current on state (S201). In the instant case, the on state of the engine 410 may be a premise requirement for the application of the SCC mode and the SSC mode.

Next, the control unit 300 determines whether the SCC mode is set according to a signal input through the driver interface 210 (S202). For example, the control unit 300 may determine whether the SCC mode is set according to a signal transmitted through an input of a button mounted to a steering wheel and the like, a keypad, a microphone, a touch screen, and the like.

When the SCC mode is set (YES in S202), the control unit 300 may determine whether a predetermined SSC entrance condition is satisfied and determine whether the vehicle enters the SSC mode (S203). For example, when the accelerator pedal and the brake pedal are not operated and a speed of the vehicle is greater than a predetermined speed, the control unit 300 may determine that the SSC entrance condition is satisfied based on an accelerator pedal detection signal, a brake pedal detection signal, and a vehicle speed signal.

When the predetermined SSC entrance condition is not satisfied (NO in S203), the control unit 300 determines that the vehicle fails to enter the SSC mode and terminates an SCC-SSC combination control. In the instant case, the engine 410 maintains the on state.

When the predetermined SSC entrance condition is satisfied and the vehicle enters the SSC mode (YES in S203), the control unit 300 interrupts the supply of fuel to the engine 410 (fuel cut) to turn off the engine 410, and controls the clutch 420 to interrupt the transmission of power to the transmission 430 (clutch off) (S204).

Next, the control unit 300 determines whether a road on which the vehicle is travelling is uphill based on an uphill/downhill signal transmitted from the detecting unit 200 (S205). For example, when a gradient of a road on which the vehicle is travelling is greater than a predetermined reference value A, the uphill/downhill detecting unit 240 determines that the road is uphill, and when the gradient of the road on which the vehicle is travelling is smaller than the predetermined reference value A, the uphill/downhill detecting unit 240 determines that the road is downhill, and transmits the determined uphill/downhill signal to the control unit 300.

When the gradient of the road is uphill (YES in S205), the control unit 300 detects an SOC value of the battery 450 and investigates an operation possibility of the MHSG 440 (S206). The engine 410 is in an off state in the SSC mode, so that the control unit 300 performs a first SOC investigation for determining whether it is possible to increase a speed of the vehicle with a compensation torque of the MHSG 440 due to the enough SOC value of the battery 450 and whether it is possible to decrease a speed of the vehicle with a regenerative torque of the MHSG 440.

For example, when the SOC value of the battery 450 is greater than a first reference value and is equal to or smaller than a second reference value, the control unit 300 determines that the SOC value of the battery 450 is enough, and when the SOC value of the battery 450 belongs to other ranges, the control unit 300 determines that the SOC value of the battery 450 is not enough. In the instant case, the first reference value is the SOC (%) in the level in which the MHSG 440 is configured for motoring by the battery 450, and the second reference value is the SOC (%) in the level in which the battery 450 is chargeable during the regenerative braking of the MHSG 440. For example, the SOC (%) which is greater than the first reference value and is equal to or smaller than the second reference value may include 70% and 80%.

When the SOC value of the battery 450 is not enough, it is difficult to increase the vehicle speed by the motoring of the MHSG 440 (NO in S206), so that the control unit 300 releases the SSC mode, resumes the supply of fuel to the engine 410 and turns on the engine 410, and fastens the clutch 420 (S207).

Next, when the SOC value of the battery 450 is enough (YES in S206), the control unit 300 performs a first distance monitoring of determining whether a distance to the front vehicle is decreased based on a front distance signal transmitted from the detecting unit 200 (S208).

In the SCC mode, the vehicle needs to be operated to maintain a predetermined interval from the front vehicle, so that when it is determined that the distance to the front vehicle is smaller than the predetermined interval, the control unit 300 performs a control of increasing the distance to the front vehicle until the distance becomes the predetermined interval by decreasing the vehicle speed. In contrast to this, when it is determined that the distance to the front vehicle is greater than the predetermined interval, the control unit 300 performs a control of decreasing the distance to the front vehicle until the distance becomes the predetermined interval by increasing the vehicle speed.

When the distance to the front vehicle is decreased (YES in S208), the control unit 300 determines a regenerative torque according to a target decrease speed to increase the distance to the front vehicle until the distance becomes the predetermined interval by decreasing the vehicle speed, and controls the MHSG 440 to output the determined regenerative torque (S209). Accordingly, the vehicle speed is decreased due to the regenerative braking of the MHSG 440, so that the distance to the front vehicle is increased and the battery 450 is charged.

Next, when it is not determined that the distance to the front vehicle is decreased (NO in S208), the control unit 300 performs the first distance monitoring of determining whether the distance to the front vehicle is increased based on the front distance signal transmitted from the detecting unit 200 (S210).

When the distance to the front vehicle is increased (YES in S210), the control unit 300 determines a compensation torque according to a target increase speed to decrease the distance to the front vehicle until the distance becomes the predetermined interval by increasing the vehicle speed, and controls the MHSG 440 to output the determined compensation torque (S211). Accordingly, the vehicle speed is increased through the motoring of the MHSG 440 and the distance to the front vehicle is decreased.

Referring to FIG. 5, next, when the road gradient is downhill, not uphill (NO in S205), the control unit 300 performs a second distance monitoring of determining whether the distance to the front vehicle is decreased based on the front distance signal transmitted from the detecting unit 200 (S301). When the SCC mode is applied, the control unit 300 controls peripheral devices so that the vehicle travels while maintaining a predetermined interval from the front vehicle. In the instant case, the predetermined interval may be differently set depending on performance of the brake 490, an intention of a designer, and the like.

In the SCC mode, the vehicle needs to be operated to maintain the predetermined interval from the front vehicle, so that when it is determined that the distance to the front vehicle is smaller than the predetermined interval, the control unit 300 performs a control of increasing the distance to the front vehicle until the distance becomes the predetermined interval by decreasing the vehicle speed. In contrast to this, when it is determined that the distance to the front vehicle is greater than the predetermined interval, the control unit 300 performs a control of decreasing the distance to the front vehicle until the distance becomes the predetermined interval by increasing the vehicle speed.

When it is necessary to decrease the vehicle speed due to the decrease in the distance to the front vehicle (YES in S301), the control unit 300 performs a second SOC investigation of detecting the SOC value of the battery 450 and determining a regenerative braking possibility of the MHSG 440 (S302). When the regenerative braking of the MHSG 440 exists in the state where the SOC value of the battery 450 is enough, a problem, such as deterioration of the battery, may occur, so that the control unit 300 does not perform the regenerative braking of the MHSG 440 when the SOC value of the battery 450 is enough.

When the SOC value of the battery 450 is not enough (NO in S302), the control unit 300 determines a regenerative torque according to a target decrease speed to increase the distance to the front vehicle until the distance becomes the predetermined interval by decreasing the vehicle speed, and controls the MHSG 440 to output the determined regenerative torque (S303). Accordingly, the vehicle speed is decreased due to the regenerative braking of the MHSG 440, so that the distance to the front vehicle is increased and the battery 450 is charged.

Next, when the SOC value of the battery 450 is enough (YES in S302), the control unit 300 determines whether a brake negative pressure is in a normal state (S304). When the SOC value of the battery 450 is enough, it is impossible to decrease the vehicle speed through the MHSG 440, so that the braking control through the ESC 440 or the brake 490 is required, and the normal state of the brake negative pressure is verified on the premise of the necessity of the braking control through the ESC 440 or the brake 490.

Next, when the brake negative pressure is not sufficient, so that it is not determined that the brake negative pressure is in the normal state, even though the driver presses the brake 490, it is impossible to accurately recognize the braking intention of the driver (NO in S304), so that the control unit 300 releases the SSC mode and turns on the engine 410 to secure the brake negative pressure (S305).

Next, when the brake negative pressure is sufficient, so that it is determined that the brake negative pressure is in the normal state (YES in S304) or the brake negative pressure is secured due to the turn-on of the engine 410, the control unit 300 investigates a normal state of an ESC system (S306).

Next, when the ESC system is in an abnormal state (NO in S306), the control unit 300 induces the driver to press the brake 490 and decreases the speed of the vehicle (S307). When the ESC system is in the normal state (YES in S306), the control unit 300 decreases the speed of the vehicle through the ESC braking control (S308).

Next, when it is not determined that the distance to the front vehicle is decreased (NO in S09), the control unit 300 performs a second distance monitoring of determining whether the distance to the front vehicle is increased based on the front distance signal transmitted from the detecting unit 200 (S309).

Next, when it is necessary to increase the vehicle speed due to the increase in the distance to the front vehicle (YES in S309), the control unit 300 performs a third SOC investigation of detecting the SOC value of the battery 450 and determining a motoring possibility of the MHSG 440 (S310).

Next, when the SOC value of the battery 450 is enough (YES in S310), the control unit 300 determines a compensation torque according to a target increase speed to decrease the distance to the front vehicle until the distance becomes the predetermined interval by increasing the vehicle speed, and controls the MHSG 440 to output the determined compensation torque (S311). Accordingly, the vehicle speed is increased through the motoring of the MHSG 440 and the distance to the front vehicle is decreased.

Next, when the SOC value of the battery 450 is not enough (NO in S310), the increase in the vehicle speed through the MHSG 440 is impossible, so that the control unit 300 releases the SSC mode, resumes the supply of fuel to the engine 410 and turns on the engine 410, and fastens the clutch 420 (S312). Accordingly, the vehicle speed is increased with the torque of the engine 410 to decrease the distance to the front vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle, the method comprising:
   determining, by a control unit, whether an Start Stop Control (SSC) entrance condition is satisfied when a Smart Cruise Control (SCC) mode is set;
   in a response that the SSC entrance condition is determined by the control unit, to be satisfied to enter an SSC mode, interrupting, by the control unit, a supply of fuel to an engine and turning off the engine;

monitoring, by the control unit, a distance in which the control unit determines whether the distance to a front vehicle is increased or decreased based on a front distance signal transmitted from the detecting unit to the control unit; and increasing or decreasing, by the control unit, a vehicle speed by controlling the engine, a Mild Hybrid Starter Generator (MHSG), or an Electronic Stability Control (ESC) based on the monitoring of the distance.

2. The method of claim 1, wherein the increasing or decreasing of the vehicle speed includes:

in a response that the control unit determines that the distance to the front vehicle is decreased in the monitoring of the distance, determining whether a State of charge (SOC) value of a battery is in a predetermined range; and in a response that the SOC value of the battery is beyond the predetermined range, determining a regenerative torque according to a target decrease speed and controlling the MHSG to output the determined regenerative torque.

3. The method of claim 2, wherein the increasing or decreasing of the vehicle speed further includes:

in a response that the SOC value of the battery is in the predetermined range, determining whether a brake negative pressure is greater than a predetermined pressure value; and in a response that the brake negative pressure is determined by the control unit, to be equal to or lower than the predetermined pressure value, releasing the SSC mode, turning on the engine, and securing the brake negative pressure.

4. The method of claim 3, wherein the increasing or decreasing of the vehicle speed further includes:

in a response that the brake negative pressure is determined by the control unit, to be greater than the predetermined pressure value, determining whether an ESC system is normal; and in a response that the ESC system is determined by the control unit to be normal, performing an ESC braking control.

5. The method of claim 1, wherein the increasing or decreasing of the vehicle speed includes:

in a response that the control unit determines that the distance to the front vehicle is increased in the monitoring of the distance, determining whether an SOC value of a battery is in a predetermined range; and in a response that the SOC value of the battery is in the predetermined range, determining a compensation torque according to a target increase speed and controlling the MHSG to output the determined compensation torque.

6. The method of claim 5, wherein the increasing or decreasing of the vehicle speed further includes:

in a response that the SOC value of the battery is beyond the predetermined range, releasing the SSC mode, resuming the supply of fuel to the engine and turning on the engine.

7. A method of controlling a vehicle, the method including:

determining, by a control unit, whether an Start Stop Control (SSC) entrance condition is satisfied when a Smart Cruise Control (SCC) mode is set;

in a response that the SSC entrance condition is determined by the control unit, to be satisfied to enter an SSC mode, interrupting, by the control unit, a supply of fuel to an engine and turning off the engine;

in a response that the engine is turned off, determining, by the control unit, whether a road on which the vehicle is travelling is uphill or downhill based on an uphill/downhill signal transmitted from a detecting unit electrically-connected to the control unit; and increasing or decreasing, by the control unit, a vehicle speed by controlling the engine, a Mild Hybrid Starter Generator (MHSG), or an Electronic Stability Control (ESC) according to a result of determining whether the road on which the vehicle is travelling is uphill or downhill.

8. The method of claim 7, wherein the increasing or decreasing of the vehicle speed includes:

a first State Of Charge (SOC) investigation operation in which when the road on which the vehicle is travelling is determined by the control unit to be uphill, the control unit determines whether an SOC value of a battery is in a first predetermined range; and a first distance monitoring operation in which when the SOC value of the battery is in the first predetermined range in the first SOC investigation operation, the control unit is configured to determine whether to increase or decrease a distance to a front vehicle based on a front distance signal transmitted from the detecting unit to the control unit.

9. The method of claim 8, wherein the increasing or decreasing of the vehicle speed further includes:

in a response that the control unit determines that the distance to the front vehicle is decreased in the first distance monitoring operation, determining a regenerative torque according to a target decrease speed and controlling the MHSG to output the determined regenerative torque.

10. The method of claim 8, wherein the first distance monitoring operation further includes:

in a response that the control unit determines that the distance to the front vehicle is increased in the first distance monitoring operation, determining a compensation torque according to a target increase speed and controlling the MHSG to output the determined compensation torque.

11. The method of claim 8, wherein the increasing or decreasing of the vehicle speed further includes:

in a response that the SOC value of the battery is beyond the first predetermined range in the first SOC investigation operation, releasing the SSC mode, resuming the supply of fuel to the engine, and turning on the engine.

12. The method of claim 7, wherein the increasing or decreasing of the vehicle speed includes:

a second distance monitoring operation in which when the road on which the vehicle is travelling is determined by the control unit, to be downhill, the control unit is configured to determine whether to increase or decrease a distance to a front vehicle based on a front distance signal transmitted from the detecting unit to the control unit.

13. The method of claim 12, wherein the increasing or decreasing of the vehicle speed further includes:

a second SOC investigation operation in which when the control unit determines that the distance to the front vehicle is decreased in the second distance monitoring operation, determining whether an SOC value of a battery is in a second predetermined range; and in a response that the SOC value of the battery is beyond the second predetermined range in the second SOC investigation operation, determining a regenerative torque according to a target decrease speed and controlling the MHSG to output the determined regenerative torque.

14. The method of claim 13, wherein the increasing or decreasing of the vehicle speed further includes:
   in a response that the SOC value of the battery is in the second predetermined range in the second SOC investigation operation, determining whether a brake negative pressure is greater than a predetermined pressure value; and
   in a response that the brake negative pressure is determined by the control unit, to be equal to or lower than the predetermined pressure value, releasing the SSC mode, turning on the engine, and securing the brake negative pressure.

15. The method of claim 14, wherein the increasing or decreasing of the vehicle speed further includes:
   in a response that the brake negative pressure is determined by the control unit, to be greater than the second predetermined pressure value, determining whether an ESC system is normal; and
   in a response that the ESC system is determined by the control unit to be normal, performing an ESC braking control.

16. The method of claim 12, wherein the increasing or decreasing of the vehicle speed further includes:
   a third SOC investigation operation in which in a response that the control unit determines that the distance to the front vehicle is increased in the second distance monitoring operation, determining whether an SOC value of a battery is in a third predetermined range; and
   in a response that the SOC value of the battery is determined by the control unit to be in the third predetermined range in the third SOC investigation operation, determining a compensation torque according to a target increase speed and controlling the MHSG to output the determined compensation torque.

17. The method of claim 16, wherein the increasing or decreasing of the vehicle speed further includes:
   in a response that the SOC value of the battery is determined by the control unit to be beyond the third predetermined range in the third SOC investigation operation, releasing the SSC mode, resuming the supply of fuel to the engine, and turning on the engine.

18. An apparatus of controlling a vehicle, the apparatus comprising:
   a detecting unit configured to output at least one detection signal among a vehicle speed signal, a front distance signal, an uphill/downhill signal, an accelerator pedal detection signal, and a brake pedal detection signal; and
   a control unit electrically-connected to the detecting unit and configured to receive the at least one detection signal, determine whether a Smart Cruise Control (SCC) mode is set and enter a Start Stop Control (SSC) mode, interrupt a supply of fuel to an engine when the SCC mode and the SSC mode are applied, and turn off the engine,
   wherein the control unit is configured to determine whether a distance to a front vehicle is increased or decreased based on a front distance signal transmitted from the detecting unit to the control unit in an off state of the engine and increases or decreases a vehicle speed by controlling the engine, a Mild Hybrid Starter Generator (MHSG), or an Electronic Stability Control (ESC) based on a result of determining whether the distance to the front vehicle is increased or decreased.

19. The apparatus of claim 18,
   wherein, in a response that the control unit determines that the distance to the front vehicle is decreased, the control unit determines whether a State of charge (SOC) value of a battery is in a predetermined value, and when the SOC value of the battery is beyond the predetermined range, the control unit is configured to determine a regenerative torque according to a target decrease speed and is configured to control the MHSG to output the determined regenerative torque,
   wherein, in a response that the SOC value of the battery is determined by the control unit to be in the predetermined range, the control unit is configured to determine whether a brake negative pressure is greater than a predetermined pressure value, and when the brake negative pressure is equal to or lower than the predetermined pressure value, the control unit is configured to release the SSC mode, to operate the engine, and to secure the brake negative pressure, and
   wherein, in a response that the brake negative pressure is greater than the predetermined pressure value or the brake negative pressure is secured, the control unit is configured to determine whether an ESC system is normal, and when the ESC system is normal, the control unit is configured to perform an ESC braking control.

20. The apparatus of claim 18,
   wherein, in a response that the control unit determines that the distance to the front vehicle is increased, the control unit is configured to determine whether an SOC value of a battery is in a predetermined range, and when the SOC value of the battery is determined by the control unit to be in the predetermined range, the control unit is configured to determine a compensation torque according to a target increase speed and is configured to control the MHSG to output the determined compensation torque, and
   wherein, in a response that the SOC value of the battery is beyond the predetermined range, the control unit is configured to release the SSC mode, to resume the supply of fuel to the engine, and to operate the engine.

* * * * *